July 27, 1965
N. F. SCHINK
3,197,337
STARCH HEATER AND METHOD
Filed Jan. 18, 1963
2 Sheets-Sheet 1
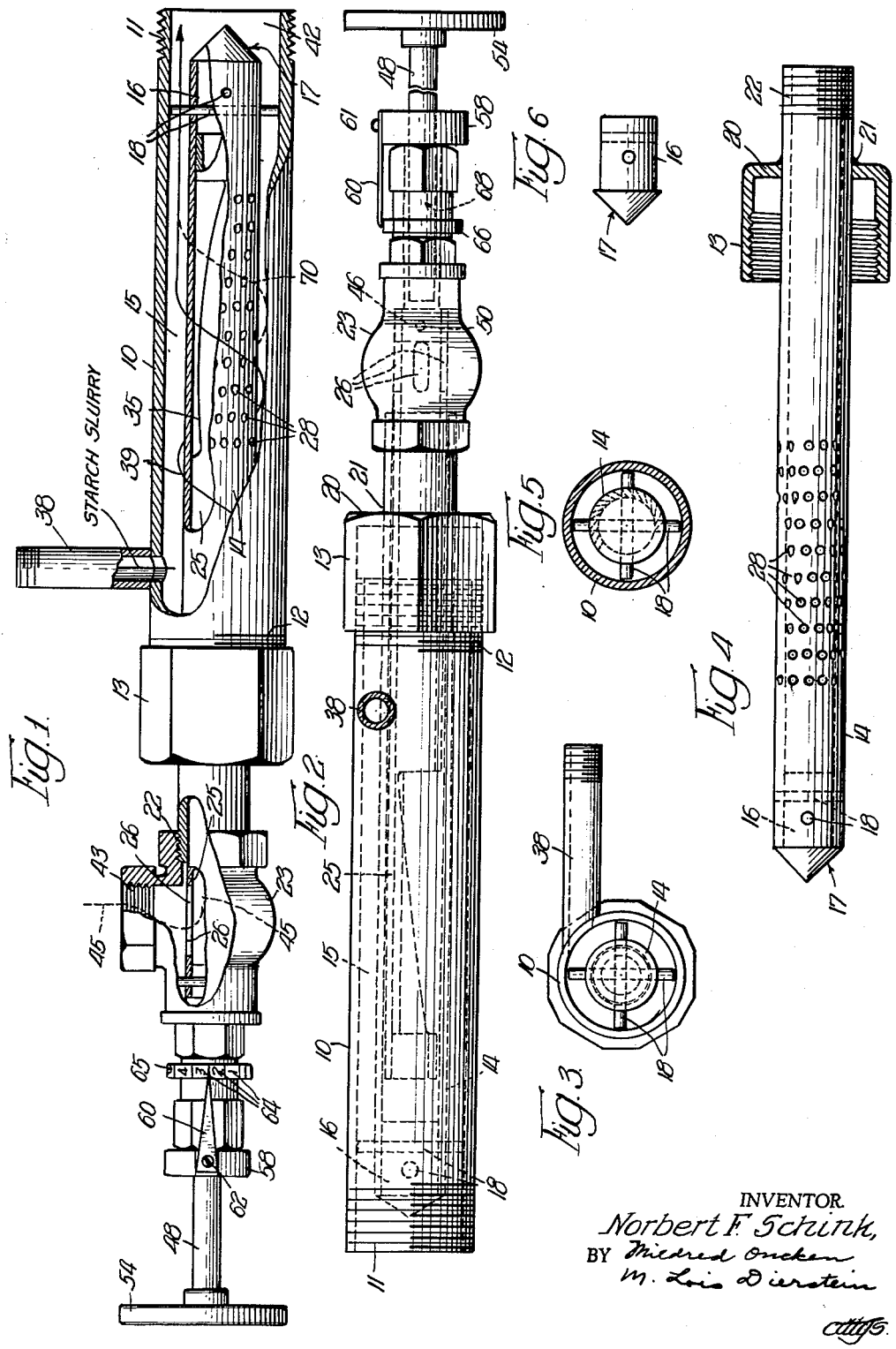
INVENTOR.
Norbert F. Schink,
BY July 27, 1965  N. F. SCHINK  3,197,337
STARCH HEATER AND METHOD
Filed Jan. 18, 1963  2 Sheets-Sheet 2
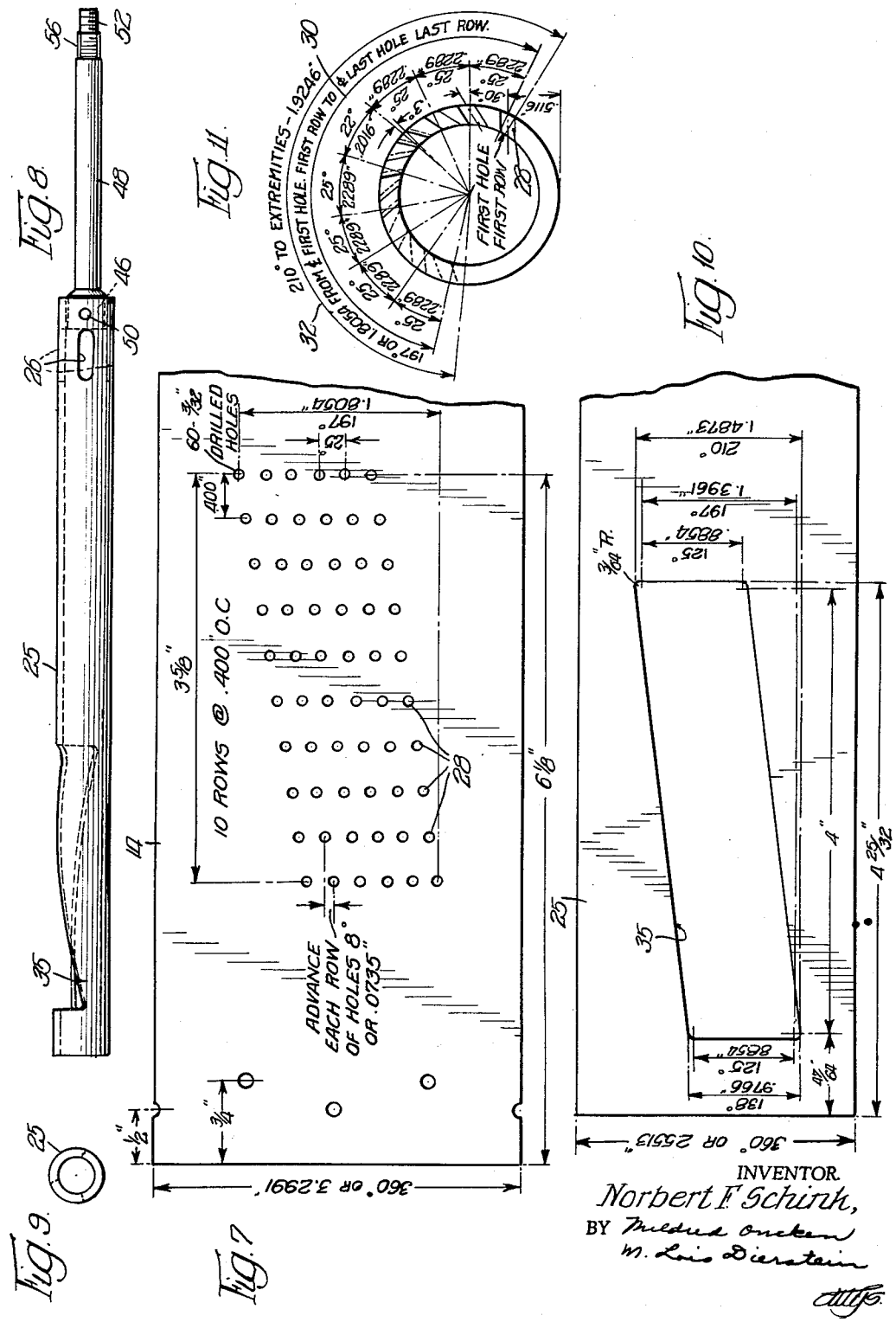
INVENTOR.
Norbert F. Schink,

United States Patent Office 3,197,337
Patented July 27, 1965

3,197,337
STARCH HEATER AND METHOD
Norbert F. Schink, River Forest, Ill., assignor to Corn Products Company, New York, N.Y., a corporation of Delaware
Filed Jan. 18, 1963, Ser. No. 252,427
17 Claims. (Cl. 127—28)

This invention relates to an improved heater and method and more particularly to an improved tangential type starch slurry heater and method for heating and gelatinizing starch slurry.

The most critical component of any starch cooking system is the heater, especially when a direct steam injection type is used. Surging results in poor quality products due to non-uniform heating. A great number of variables are encountered in starch heating applications. These are extremes in viscosity (50 to 5,000 c.p.s.), flow rates, cooking temperatures, rheological properties of the heated products, and uniformity of heating. In addition, if the heater is of proper character, an inexpensive device such as a steam pressure reducer may be used for temperature control.

With present heaters, it is necessary to completely stop cooking operations to make changes in the size or number of steam tangents. Further, for a given flow rate and increment of temperature (T), the optimum steam pressure drop across the tangents varies with the viscosity of the starch being heated so that in many instances, it is not possible to predict the heater settings for optimum performance and it must be done by trial and error.

An important object of the present invention resides in the provision of an improved heater and method and more particularly an improved tangential type starch slurry heater and method, wherein the steam pressure across the orifices can be varied infinitely during operation and without stopping the heating or cooking operation.

Another object is to provide for obtaining an essentially closed position by the provisions for varying the steam pressure across the orifices, thereby stopping the heating or cooking operation.

Another object is to reduce the size of the steam orifice not only to improve the efficiency of heating, but also to reduce local wear on the heating tube.

Another object is to provide a tangential type starch slurry heater comprising an outer casing, an injector tube arranged within the casing, an inner pipe arranged within the injector tube and having a cut out area through which the steam passes from the inner pipe and flows through a multitude of orifices in the injector tube and contacts the starch slurry in the space or chamber between the injector tube and the casing, and wherein the inner pipe is mounted to turn relative to the injector tube for varying the register of the cut out area with the orifices and the steam pressure across the orifices during the operation of the heater.

Another object is to provide for obtaining an essentially closed position by turning the inner pipe within the injector tube.

Another object is to provide a tangential type starch slurry heater, wherein an essentially closed position can be obtained by turning the inner pipe within the injector tube.

Another object is to provide a tangential type starch slurry heater, wherein the orifices in the injector tube are of a diameter from 3/32 inch to about 0.040 inch.

Another object is to provide a tangential type starch slurry heater, wherein the orifices in the injector tube are arranged in generally helical pattern.

Another object is to provide a tangential type starch slurry heater, wherein the orifices in the injector tube are arranged in generally helical pattern and the cut out area in the wall of the inner pipe is elongated longitudinally, arranged in generally helical pattern over the longitudinal extent of the orifice pattern area, and in essentially full open position opens about 40 of the orifices in the injector tube for passage of steam into the starch slurry in the chamber between the outer casing and the injector tube.

Another object is to provide a tangential type starch slurry heater, wherein the injector tube is provided with rod means projecting therefrom for cooperation with the outer tubular casing to keep the injector tube centered within the outer tubular casing.

Further features and advantages and adaptations of the invention will be apparent from the following detailed description taken in connection with the accompanying drawings, it being understood that the invention is limited only within the scope of the appended claims, and not to the particular embodiment selected for illustration.

In the drawings:
FIGURE 1 is a partially cutaway view of a starch heater embodying the present invention;
FIGURE 2 is a side view of the heater;
FIGURE 3 is a front view of the heater;
FIGURE 4 is a side view of the injector tube or pipe with the multitude of orifices through which the steam flows into contact with the starch slurry;
FIGURE 5 is a front view of the injector tube showing the outer tubular casing or pipe in section;
FIGURE 6 is a side view of the plug for the front end of the injector tube;
FIGURE 7 is a fragmentary developed view of the surface of the injector tube showing the pattern of the orifices through the wall thereof;
FIGURE 8 is a side view of the inner pipe with its steam inlet and its cut out area through which the steam passes from the inner pipe and flows through the orifices in the injector tube;
FIGURE 9 is a front view of the inner pipe;
FIGURE 10 is a fragmentary developed view of the surface of the inner pipe showing the pattern of the cut out area; and
FIGURE 11 is a detail view of the injector tube showing more or less schematically the arrangement of the orifices through the wall thereof.

Referring to the drawings, the starch heater according to the present invention comprises an outer tubular casing or pipe 10 which in one illustrative embodiment of the invention has an outside diameter of 1.90 inches. The outlet end of the pipe 10 is threaded externally at 11 and the opposite end is threaded externally at 12 and screwed into a pipe cap 13.

An injector tube or pipe 14 is arranged axially within and extends longitudinally of the pipe 10. In the selected illustrative embodiment of the invention the pipe 14 has an outside diameter of 1.05 inch. The outer periphery of the pipe 14 is spaced inwardly from the inner periphery of the pipe 10 to form an annular chamber 15. The front end of the pipe 14 is closed by a plug 16 having a closed outer end tapered at about 45 degrees at 17. Diametrical rods 18 extend through the wall of the pipe 14 and through the plug 16 and project from the pipe 14 for cooperation with the interior of the pipe 10 to keep the front end of the pipe 14 centered within the pipe 10.

The pipe 14 projects through an opening in the wall 20 of the pipe cap 13 and is welded thereto at 21. The adjacent end of the pipe 14 is threaded externally at 22 and screwed into a valve body 23 from which the valve seat has been removed.

An inner pipe 25 having in the selected illustrative embodiment of the invention an outside diameter of 0.812 inch is arranged axially within the pipe 14 and extends longitudinally thereof. The pipe 25 projects from the threaded end 22 of the pipe 14 and into the valve body 23. Within the valve body 23 the pipe 25 has four elongated openings or holes 26 spaced 90 degrees apart which open through the wall of the pipe 25 for admission of steam from the valve body 23 into the pipe 25 for travel through the inside of this pipe.

The pipe 14 has a multitude of orifices or holes 28 drilled through the wall thereof. Although not limiting insofar as the present invention is concerned, in the selected illustrative embodiment of the invention sixty 3/32 inch diameter holes or orifices 28 are shown arranged in a generally helical pattern. In FIGURE 7 ten longitudinally spaced rows of orifices 28 are shown with six orifices in each row. As also indicated in FIGURE 7 the transverse center lines of each row of holes or orifices are .400 inch apart and each row of orifices 28 is advanced 8 degrees or .0735 inch as also indicated in FIGURE 7. As further shown in FIGURE 7 the centers of the orifices 28 in each row are 25 degrees apart.

As further illustrative, but not limiting with regard to the present invention, the dimensions of the developed surface of the injector tube and the orifice pattern are shown in FIGURE 7.

For further information with regard to the pattern of the orifices 28 reference is directed to FIGURE 11 in which the lower orifice 28 at the right hand side of the pipe 14 is the first orifice in the first row. The arcuate line 30 between the arrows at the ends thereof is from the center line of the first hole in the first row to the center line of the last hole in the last row and measures 197 degrees or 1.8054 inches. The arcuate line 32 between the arrows at the ends thereof is to the extremities of the holes or orifices and measures 210 degrees or 1.9264 inches. The angular relation of the holes or orifices 28 is illustrated in FIGURE 7.

More particularly in the illustrated embodiment of the invention the steam orifices 28 are drilled at an angle of 60 degrees off the tangent of the surface of the pipe 14. An angle of 45 degrees off the tangent would make the orifices essentially tangential and would present limitations in locating the orifices.

Again, although not limiting insofar as the present invention is concerned, in the selected illustrative embodiment of the invention the pipe 25 has a cut out area 35 through the wall thereof through which the steam passes from the inner pipe 25 and flows through the orifices 28 in the pipe 14. The cut out area 35 is elongated longitudinally and arranged in generally helical pattern as shown in the fragmentary developed view of the surface of the inner pipe appearing in FIGURE 10.

The dimensions and arcuate extent of the cut out area 35 and the surface of the inner pipe of the illustrated embodiment of the invention are shown in FIGURE 10. When in essentially full open position the cut out area opens over all ten rows of orifices and opens about 40 of these orifices in the pipe 14 for passage of steam into the starch slurry in the annular chamber 15.

While about 40 holes or orifices 28 of about 3/32 inch diameter are used, it is to be understood that this may vary. For lower capacity units, smaller holes or orifices 28 of about 0.040 inch diameter may be used. For higher capacity units, more holes 28 of about 3/32 inch diameter may be used.

The outer casing or pipe 10 has a tangential type nipple 38 through which the starch slurry enters the heater and particularly the annular chamber 15 as indicated in FIGURE 1. The starch slurry flows helically through the chamber 15 about the pipe 14 as indicated by the line 39 in FIGURE 1 and passes from the outlet 42 as gelatinized starch.

Steam flows through the inlet 43 of the valve body 23 and enters the inner pipe 25 through the openings 26 as shown by the dotted lines 45 in FIGURE 1. The steam travels through the inside of the inner pipe 25 and flows through the cut out area 35 and through the holes or orifices 28 drilled through the wall of the pipe 14 and into the chamber where the steam contacts the starch slurry. The gelatinized starch passes from the outlet 42 of the outer pipe as previously described.

The orifice and valve seat of the angle needle valve 23 are removed, for example, by drilling, and the enlarged end 46 of the valve stem 48 is secured in the adjacent end of the inner steam pipe 25, for example, by a diametrical rod 50. The opposite end of the valve stem 48 is externally threaded at 52 and has an external valve handle 54 secured on the polygonal part 56 of the valve stem 48. Manual turning of the handle 54 turns the valve stem 48 and the inner pipe 25 therewith. The turning of the inner pipe 25 is about its longitudinal axis and in this way the amount of register of the cut out area 35 in the inner pipe 25 with the holes or orifices 28 in the pipe 14 may be varied, and an essentially closed position may be obtained by turning of the inner pipe 25. This may be done during operation of the heater and without stopping the heater in order to make changes in the size or number of steam tangents. This is an important aspect of the heater of the present invention.

Fixed on the valve stem 48 is a member 58 which has a steam port opening indicator 60 attached thereto as shown at 61 in FIGURE 2, or at 62 in FIGURE 1. The indicator 60 cooperates with numbers or other markings 64 on the member 65, as shown in FIGURE 1, or with markings on the member 66, as shown in FIGURE 2, for indicating the amount of steam port or orifice opening and the essentially closed position of the holes or orifices 28. A packing gland is shown at 68 in FIGURE 2.

The bonnet of the valve 23 may serve as the packing gland. Moreover, the location of the valve may be changed to meet installation requirements and may be fixed in the desired position by welding or soldering.

In the operation of the starch heater according to the present invention the starch slurry enters the annular chamber 15 through the tangential pipe nipple 38 and flows helically through the chamber 15 about the pipe 14 as indicated by the line 39 in FIGURE 1.

The steam flows through the inlet 43 of the valve 23 and enters the pipe 25 through the openings 26 therein as shown by the dotted lines 45 in FIGURE 1. The steam travels through the inside of the pipe 25 and flows through the cut out area 35 in the inner pipe 25 and through the holes or orifices 28 through the wall of the pipe 14 generally as indicated by the dotted line 70 in FIGURE 1. As the steam enters the chamber 15 it contacts the starch slurry. The gelatinized starch passes, as previously indicated, from the outlet 42 of the outer pipe 10 as indicated in FIGURE 1.

In heating starch slurries, the pressure drop across the orifices is very important for uniform heating and depends on the viscosity at the heated temperature. With the heater according to the present invention, the optimum steam pressure setting can be determined rapidly and maintained in continuous operation without stopping the heater to make physical changes. This is accomplished by grasping the valve handle 54 and turning the same to turn the inner pipe 25 for varying the register of the cut out area 35 with the orifices 28 and thereby the steam pressure across the orifices during the operation of the heater. Moreover, an essentially closed position may be obtained by turning the inner pipe 25 within the pipe 14.

Thus, the number of steam tangents may be varied during the operation of the heater so as to obtain maximum performance of the heater. The steam velocity through the orifices may vary from about 30,000 feet per second to about 80,000 feet per minute. This high velocity is desired in order to obtain the excellent mixing required particularly for high viscosity (1 to $5 \times 10^6$ centipoise) materials. With the present heater the higher steam pressure on the steam supply line prevents material from backing up into the steam line. The performance of the heater according to the present invention in either heating water or high solids (38 percent) unmodified starch slurry is excellent and has very distinct advantages over prior heaters.

The heater of the present application provides for meeting the variables which are encountered in starch heating applications. These, as previously indicated, are extremes in viscosity (50 to 5,000 cps.), flow rates, cooking temperatures, rheological properties of the heated products, and uniformity of heating. The invention provides for meeting the optimum steam pressure drop across the tangents which varies with the viscosity of the starch being heated.

The embodiment of the invention disclosed in the drawings and the specification is for illustrative purposes only, and it is to be expressly understood that said drawings and the specification are not to be construed as a definition of the limits or scope of the invention, reference being had to the appended claims for that purpose.

I claim:

1. A tangential type starch slurry heater comprising an outer tubular casing, an injector tube arranged within and extending longitudinally of said casing and spaced inwardly from the wall of the casing to form an annular chamber between said injector tube and said casing, said casing having a tangential inlet through which starch slurry enters said annular chamber and flows helically through said chamber about said injector tube for passage from an outlet from said chamber as gelatinized starch, said injector tube having a multitude of orifices through which steam flows into contact with the starch slurry in said chamber, and an inner pipe arranged within and extending longitudinally of said injector tube and having a steam inlet for the entry of steam for travel through the inside of said inner pipe, said inner pipe having a cut out area in the wall thereof through which the steam passes from said inner pipe and flows through the orifices in the injector tube and contacts the starch slurry in said chamber, said inner pipe being mounted to turn relative to said injector tube for varying the register of said cut out area with said orifices and the steam pressure across said orifices during operation of the heater.

2. A tangential type starch slurry heater according to claim 1, wherein an essentially closed position can be obtained by turning the inner pipe within the injector tube.

3. A tangential type starch slurry heater according to claim 1, wherein the orifices in the injector tube are at an angle of about 60 degrees off the tangent of the injector tube surface.

4. A tangential type starch slurry heater according to claim 1, wherein the orifices in the injector tube are of a diameter from about 3/32 inch to about 0.040 inch.

5. A tangential type starch slurry heater according to claim 1, wherein the orifices in the injector tube are of a diameter from about 3/32 inch to about 0.040 inch and at an angle of about 60 degrees off the tangent of the injector tube surface.

6. A tangential type starch slurry heater according to claim 1, wherein the orifices in the injector tube are arranged in generally helical pattern.

7. A tangential type starch slurry heater according to claim 1, wherein the orifices in the injector tube are arranged in generally helical pattern and the cut out area in the wall of the inner pipe is elongated longitudinally, arranged in generally helical pattern over the longitudinal extent of the orifice pattern and in essentially full open position opens about 40 of the orifices in the injector tube for passage of steam into the starch slurry in the annular chamber.

8. A tangential type starch slurry heater according to claim 1, wherein the injector tube is provided with rod means projecting therefrom for cooperation with the outer tubular casing to keep the injector tube centered within said outer tubular casing.

9. A starch heater comprising an outer casing, an injector tube arranged within and extending longitudinally of said casing and spaced inwardly from the wall of the casing to form a chamber between said injector tube and said casing, said casing having a tangential inlet through which the starch material enters said chamber and flows helically through said chamber for passage from an outlet from said chamber as gelatinized starch, said injector tube having a multitude of orifices through which steam flows into contact with the starch in said chamber, and an inner pipe arranged within and extending longitudinally of said injector tube and having a steam inlet for the entry of steam for travel through the inside of said inner pipe, said inner pipe having opening means in the wall thereof through which the steam passes from said inner pipe and flows through the orifices in the injector tube and contacts the starch in said chamber, said inner pipe being mounted for movement relative to said injector tube for varying the register of said opening means with said orifices and the steam pressure across said orifices during the operation of the heater.

10. A steam injection type heater comprising an outer tubular member, a second tubular member disposed within and spaced inwardly from the wall of said outer tubular member, said outer tubular member having an inlet for admission of material to be treated by steam injection into the space between said outer and second tubular members, said second tubular member having a multitude of orifices opening through the wall thereof and into said space, and an inner tubular member disposed within said second tubular member and having a cut out area in the wall thereof through which steam passes from said inner tubular member and flows through the orifices in said second tubular member, said inner tubular member being mounted to be turned about its axis to vary the register of said cut out area with said orifices and the steam pressure across the orifices.

11. A steam injection type heater according to claim 10, wherein the inner tubular member extends into a valve body for receiving steam therefrom.

12. A steam injection type heater according to claim 10, wherein the inner tubular member extends into a valve body for receiving steam therefrom, a valve stem secured to said inner tubular member, and a handle on said valve stem for turning said valve stem and said inner tubular member.

13. A steam injection type heater according to claim 10, wherein the inner tubular member extends into a valve body for receiving steam therefrom, a valve stem secured to said inner tubular member, a handle on said valve stem for turning said valve stem and said inner tubular member, and a steam orifice opening indicator attached to said valve stem and coacting with a member for indicating the amount of steam orifice opening.

14. A steam injection type heater according to claim 10, wherein the inner tubular member extends into a valve body for receiving steam therefrom, a valve stem secured to said inner tubular member, a handle on said valve stem for turning said valve stem and said inner tubular member, and a steam orifice opening indicator attached to said valve stem and coacting with a member for indicating the amount of steam orifice opening and the essentially closed position of the steam orifices.

15. A steam injection type heater according to claim 10, wherein there is a pipe cap on one end of said outer tubular member, and a valve body having an inlet for receiving steam, one end of said second tubular member being attached to said valve body, the adjacent end of the inner tubular member projecting from said second tubular member into said valve body and having opening means through which steam is delivered from said valve body into the interior of said inner tubular member.

16. A steam injection type heater according to claim 10, wherein there is a pipe cap on one end of said outer tubular member, a valve body having an inlet for receiving steam, one end of said second tubular member being attached to said valve body, the adjacent end of the inner tubular member projecting from said second tubular member into said valve body and having opening means through which steam is delivered from said valve body into the interior of said inner tubular member, a valve stem secured to said inner tubular member, a handle on said valve stem for turning said valve stem and said inner tubular member, and a steam orifice opening indicator attached to said valve stem and coacting with a member for indicating the amount of steam orifice opening and the essentially closed position of the steam orifices.

17. The method of heating and gelatinizing a starch slurry which comprises disposing the starch slurry into an elongated annular configuration, introducing steam within the annular configuration and through a multitude of longitudinally and circumferentially spaced orifices into contact with the starch slurry, and varying the total area of the orifices.

References Cited by the Examiner

UNITED STATES PATENTS

| | | | |
|---|---|---|---|
| 2,730,468 | 1/56 | Martin | 261—124 X |
| 2,805,966 | 9/57 | Etheridge | 127—28 |
| 2,820,620 | 1/58 | Anderson | 261—124 |
| 2,822,157 | 2/58 | Porter | 261—124 |

MORRIS O. WOLK, *Primary Examiner.*